(12) United States Patent
Hara

(10) Patent No.: US 12,107,236 B2
(45) Date of Patent: *Oct. 1, 2024

(54) SECONDARY BATTERY

(71) Applicant: TOYOTA JIDOSHA KABUSHIKI KAISHA, Toyota (JP)

(72) Inventor: Tetsuo Hara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,068

(22) Filed: Sep. 14, 2023

(65) Prior Publication Data

US 2023/0420746 A1    Dec. 28, 2023

Related U.S. Application Data

(63) Continuation of application No. 17/027,852, filed on Sep. 22, 2020, now Pat. No. 11,799,134.

(30) Foreign Application Priority Data

Oct. 10, 2019    (JP) .................. 2019-186940

(51) Int. Cl.
*H01M 10/0587*    (2010.01)
*H01M 50/46*    (2021.01)
*H01M 50/538*    (2021.01)

(52) U.S. Cl.
CPC ....... *H01M 10/0587* (2013.01); *H01M 50/46* (2021.01); *H01M 50/538* (2021.01); *Y02E 60/10* (2013.01); *Y02P 70/50* (2015.11)

(58) Field of Classification Search
CPC ............ H01M 10/0587; H01M 50/46; H01M 50/538; Y02P 70/50; Y02E 60/10
(Continued)

(56) References Cited

U.S. PATENT DOCUMENTS

2007/0224493 A1   9/2007   Higuchi et al.
2012/0270099 A1  10/2012   Lee et al.
(Continued)

FOREIGN PATENT DOCUMENTS

CN    101043090 A    9/2007
CN    102751527 A   10/2012
(Continued)

OTHER PUBLICATIONS

Tetsuo Hara, U.S. Appl. No. 17/027,852, Non-Final Rejection issued Jun. 27, 2022.
(Continued)

*Primary Examiner* — Jonathan G Jelsma
*Assistant Examiner* — Omar M Kekia
(74) *Attorney, Agent, or Firm* — Dickinson Wright, PLLC

(57) ABSTRACT

A secondary battery includes a battery case, an electrode body, and a collector member connecting the battery case and the electrode body. A positive electrode includes an insulation layer provided so as to be adjacent to a positive electrode active material layer. The collector members include first portions, and second portions continuous to the first portions and bent relative to the first portions. The first portions are fixed to the battery case. The second portions are connected, at ends thereof opposite to the bent portions, to collector regions, respectively. The collector members further include ribs connected, at the bent portions, to the first portions and the second portions, respectively.

5 Claims, 6 Drawing Sheets

(58) Field of Classification Search
USPC .......................................................... 429/163
See application file for complete search history.

(56) References Cited

U.S. PATENT DOCUMENTS

| | | |
|---|---|---|
| 2013/0260221 A1 | 10/2013 | Yoshitake et al. |
| 2015/0380712 A1 | 12/2015 | Tsunaki et al. |
| 2016/0043373 A1 | 2/2016 | Arishima et al. |
| 2019/0198910 A1 | 6/2019 | Kondo et al. |
| 2021/0194007 A1 | 6/2021 | Danno |

FOREIGN PATENT DOCUMENTS

| | | | |
|---|---|---|---|
| CN | 105190952 | A | 12/2015 |
| CN | 108604664 | A | 9/2018 |
| JP | 2009026705 | A | 2/2009 |
| JP | 2012227113 | A | 11/2012 |
| JP | 2019114423 | A1 | 7/2019 |
| WO | 2009013592 | A1 | 1/2009 |
| WO | 2014162437 | A1 | 10/2014 |

OTHER PUBLICATIONS

Tetsuo Hara, U.S. Appl. No. 17/027,852, Non-Final Rejection issued Jan. 9, 2023.
Tetsuo Hara, U.S. Appl. No. 17/027,852, Notice of Allowance issued Jun. 16, 2023.

SECONDARY BATTERY

CROSS-REFERENCE TO RELATED APPLICATIONS

The present application is a continuation of U.S. patent application Ser. No. 17/027,852, filed Sep. 22, 2020, which claims priority to Japanese Patent Application No. 2019-186940 filed on Oct. 10, 2019, the entire contents of which are incorporated herein by reference.

BACKGROUND

1. Field of the Invention

The present invention relates to a secondary battery.

2. Description of the Related Art

Secondary batteries such as a lithium ion secondary battery and a nickel metal hydride battery have been preferably used as the power supply for driving a vehicle, other than as so-called portable power supplies for a personal computer, a portable terminal, and the like. As one example of the secondary battery, a battery is known in which an electrode body including a positive electrode and a negative electrode insulated from each other by a separator therein is accommodated in a battery case. The electrode forming the electrode body has an active material layer including an active material at the surface of a collector foil. Herein, in order to enhance the receivability of the electric charge carrier of a negative electrode active material layer of the low potential side, the negative electrode active material layer is designed so as to have a larger area than that of the positive electrode active material layer.

In this case, the negative electrode active material layer protruding from the positive electrode active material layer has a high deformation freedom degree. Accordingly, the corner part of the end of the negative electrode active material layer may break the separator, and may be short-circuited with the uncoated part not including a positive electrode active material of the positive electrode collector foil. For example, WO 2014/162437 discloses a configuration in which an insulation layer is included in the portion opposed to the negative electrode active material layer in the region of the positive electrode collector foil adjacent to the positive electrode active material layer in order to suppress such a short circuit.

SUMMARY

However, observation of the secondary battery actually used has shown that cracking or peeling may be caused in the insulation layer provided adjacent to the positive electrode active material layer. Further, it has become obvious that the insulation layer becomes more likely to be peeled with an increase in cracks of the insulation layer. Peeling of the insulation layer is desired to be improved in terms of the reduction of the insulation property between the negative electrode active material layer and the positive electrode collector foil.

The present invention has been made in view of such circumstances, and an object of the present invention is to provide a secondary battery in which occurrence of cracking and peeling of the insulation layer provided along the positive electrode active material layer is suppressed.

A study by the present inventors indicated that cracking and peeling of the insulation layer provided at the positive electrode collector is largely affected by the vibration of the battery. Namely, in one typical example of the secondary battery, the electrode body is positioned in the battery case by bonding (e.g., welding) the positive electrode side collector part and the negative electrode side collector part to the positive and negative collector members made of a metal attached to the lid member, respectively. However, the electrode body is fixed only at the welded part with the collector member, and may move or may be deformed at other parts. Then, the electrode body is the thickest at the overlapping portion of the positive electrode active material layer and the negative electrode active material layer. The collector portion without the positive electrode active material layer is less restrained by that much, resulting in a higher deformation freedom degree as compared with the portion. For this reason, conceivably, when a battery vibrates, a deviation is caused in vibration between the electrode body and the tip of the collector member; accordingly, a load is concentrated to the insulation layer provided at the collector part with a high deformation freedom degree of the electrode body; this causes cracking and peeling of the insulation layer.

Thus, as the one for solving the problem, a secondary battery herein disclosed includes: a battery case; an electrode body in which a positive electrode, a negative electrode, and a separator are stacked, with the positive electrode and the negative electrode being insulated from each other by the separator; and a collector member connected to the battery case and the electrode body. The positive electrode includes: a positive electrode collector including an active material layer forming region, an insulation layer forming region adjacent to the active material layer forming region, and a collector region adjacent to the insulation layer forming region, a positive electrode active material layer including a positive electrode active material provided on a surface of the active material layer forming region, and an insulation layer provided on a surface of the insulation layer forming region. Further, the collector member includes: a first portion, and a second portion continuous to the first portion and bent relative to the first portion. The first portion is fixed to the battery case, and the second portion is connected, at an end thereof on an opposite side to the bent portion, to the collector region. Then, the collector member further includes a rib connected, at the bent part, to the first portion and the second portion.

With the configuration, the rib is placed across the first portion and the second portion of the collector member. This suppresses the first portion and the second portion from being deformed in a direction in which the mutually formed angle decreases and a direction in which the angle increases. As a result, when a secondary battery receives a vibration, the deviation in vibration of the second portion fixed to the electrode body with respect to the vibration of the first portion fixed to the case is suppressed. This can reduce the occurrence of cracking or peeling at the insulation layer onto which the difference in vibration is concentrated. From the viewpoint that such a collector member can effectively reduce the occurrence of cracking or peeling of the insulation layer, the collector member is preferably applied to the positive electrode collector member to be bonded to the positive electrode collector provided with the insulation layer. Further, from the viewpoint that such a collector member can more stably support the electrode body and can further reduce the occurrence of cracking or peeling of the insulation layer, the collector member is preferably applied to both of the positive electrode collector member and the negative electrode collector member.

Incidentally, the difference in vibration between the first portion and the second portion of the collector member can also be reduced by enhancing the rigidity of the collector member, e.g., manufacture of the collector member using a hard material, or increasing the thickness of the member. However, a material having a higher rigidity (e.g., Young's modulus) than that of the constituent material (typically, Al or Al alloy, or Cu or Cu alloy) of a general collector member is not desirable in terms of its high electric resistance. Further, it can be said that the increase in thickness of the collector member is undesirable from the viewpoint of the cost.

Incidentally, Japanese Patent Application Publication No. 2009-026705 discloses as follows: in order to suppress the collector terminal from being deformed by a pressing force during welding between the electrode body and the collector member, and damaging the collector, the flat part including the bonding surface of the collector member to be bonded to the collector is bent. With such a configuration, although the rigidity of the bonding surface of the collector member is enhanced, peeling of the insulation layer cannot be suppressed. In terms of this point, the present invention is clearly distinguishable in configuration and technical idea from the disclosure of Japanese Patent Application Publication No. 2009-026705.

In accordance with one preferable aspect of the technology herein disclosed, the rib is connected, among surfaces of the first portion and the second portion, to a surface on an opposite side to the electrode body. This can effectively suppress the difference in vibration of the collector with respect to the battery case.

In accordance with one preferable aspect of the technology herein disclosed, the collector member includes the first portion, the second portion, and the rib, which are continuously and integrally formed, and is at least one of a bent product and a pressed product of a sheet-shaped metal. As a result, a high-strength rib can be constructed. Further, this aspect is also preferable in that the collector member can include the rib at a low cost and with efficiency.

In accordance with one preferable aspect of the technology herein disclosed, the battery case is a square battery case including a case main body having an opening, and a lid member for covering the opening. The first portion is connected to an inner surface of the lid member, and the second portion is bent along any one surface of the case main body surrounding the opening. Then, a length $L_C$ from the first portion to an extreme end of the end and a length $L_R$ of a dimension of the rib in a direction along the length $L_C$ satisfy following relationship: $L_R \geq 0.1 \times L_C$. With the configuration, it is possible to form a rib capable of effectively suppressing the vibration of the tip part of the collector member.

In accordance with one preferable aspect of the technology herein disclosed, the battery case is a square battery case including a case main body having an opening, and a lid member for covering the opening. The first portion is connected to an inner surface of the lid member, and the second portion is bent along any one surface of the case main body surrounding the opening. Then, a thickness $T_C$(mm) of a dimension in a direction orthogonal to the one surface of the second portion and a thickness $T_R$(mm) of a dimension in a direction in parallel with the one surface of the rib satisfy following relationship: $T_R \geq 0.4 \times 1/T_C$. Also with such a configuration, it is possible to effectively suppress the bending of the collector member when the secondary battery receives a vibration.

In accordance with one preferable aspect of the technology herein disclosed, the battery case is a square battery case including a case main body having an opening, and a lid member for covering the opening. The first portion is connected to an inner surface of the lid member, and the second portion is bent along any one surface of the case main body surrounding the opening. Then, a thickness $T_C$(mm) of a dimension in a direction orthogonal to the one surface of the second portion and a width $W_R$(mm) of a dimension in a direction along the thickness $T_C$ of the rib satisfy following relationship: $W_R \geq 0.25 \times 1/T_C$. As a result, it is possible to effectively suppress the bending of the collector member when the secondary battery receives a vibration.

In accordance with one preferable aspect of the technology herein disclosed, the electrode body is a wound type electrode body in which the positive electrode, the negative electrode, and the separator which are lengthy are stacked and wound. The wound type electrode body includes a curved part by winding, and hence incurs a higher load at the bonding part with the collector member than that of a sheet type electrode body including a plurality of sheet-shaped positive electrode, separator, and negative electrode stacked therein. Therefore, the configuration herein disclosed is useful because the configuration clearly produces its effect by being applied to a secondary battery including a wound type electrode body.

The secondary battery described up to this point may remarkably produce its advantageous effects, for example, when used under such environment as to be applied with a vibration. Further, the short circuit between the negative electrode active material layer and the positive electrode collector tends to become problematic for a battery in which the thickness of the electrode body is large, and the end of the negative electrode active material layer tends to be applied with a bending force, in other words, a high capacity battery. Further, a reliable measure for suppressing the short circuit has been demanded. Still further, measures have been demanded particularly for suppressing the battery temperature rise due to the microscopic short circuit in a secondary battery for uses requiring high safety. From such a viewpoint, the secondary battery herein disclosed can be in particular preferably used as power supply (main power supply) for driving a vehicle, especially, power supply for driving a hybrid vehicle, a plug-in hybrid vehicle, an electric vehicle, or the like.

DETAILED DESCRIPTION

Below, one embodiment of a secondary battery herein disclosed will be described. Incidentally, matters necessary for executing the present invention (e.g., a structure of the secondary battery not featuring the present invention), except for matters specifically referred to in the present specification (e.g., configurations, and the like of an insulation layer and a collector member) can be grasped as design matters of those skilled in the art based on the related art in the present field. The present invention can be executed based on the contents disclosed in the present specification and the technical common sense in the present field. Further, the dimensional relation (such as length, width, or thickness) in each drawing shown below does not reflect the actual dimensional relation. Then, an expression "A to B" indicating the numerical value range in the present specification means "A or more and B or less".

In the present specification, "secondary battery" is a term denoting an electric storage device capable of repeatedly charging and discharging in general, and including a so-called storage battery such as a lithium ion battery, a sodium ion secondary battery, or a lithium polymer battery, and electric storage elements such as an electric double layer capacitor. Further, "nonaqueous electrolyte secondary battery" is a secondary battery implementing charging and discharging using a nonaqueous electrolyte as an electric charge carrier. The electrolyte may be any of a solid electrolyte, a gel electrolyte, and a nonaqueous electrolyte. Further, the "active material" represents a substance capable of reversibly occluding and releasing chemical species serving as an electric charge carrier in a secondary battery. Below, the present technology will be described by taking the case where a nonaqueous electrolyte secondary battery is a lithium ion secondary battery as an example.

Figure 1:
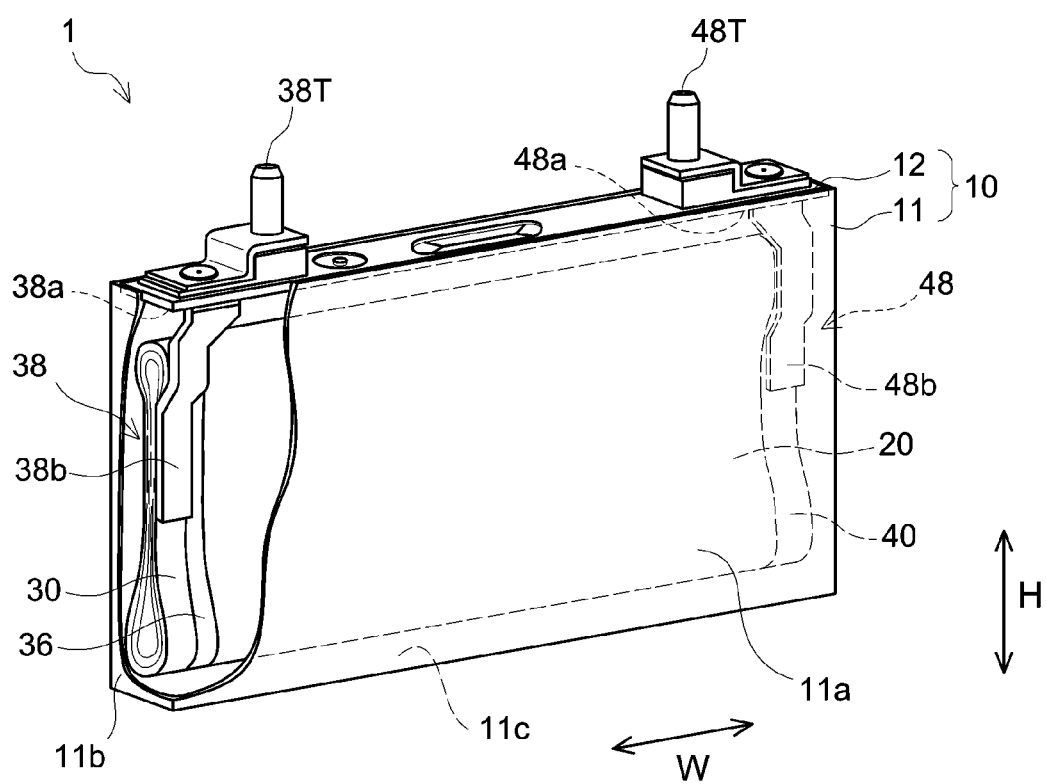
FIG. 1 is a cutaway perspective view schematically showing a configuration of a secondary battery in accordance with one embodiment.
Figure 2:
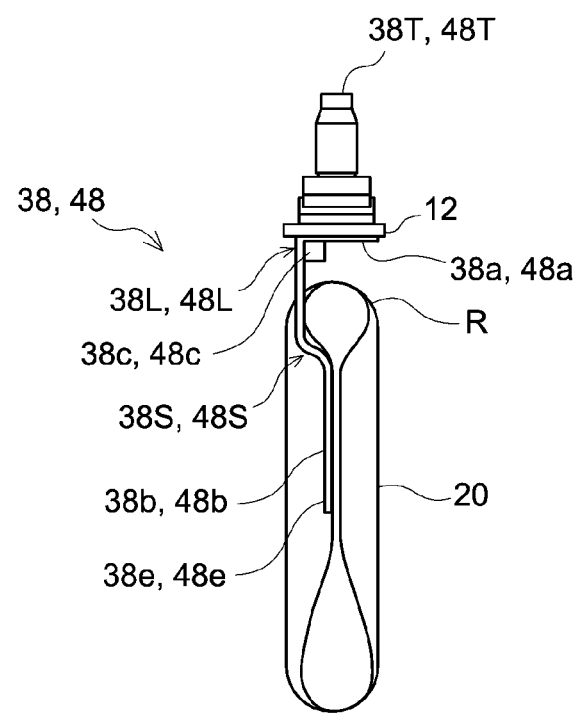
FIG. 2 an essential part side view of the secondary battery in accordance with one embodiment.
Figures 3A, 3B:
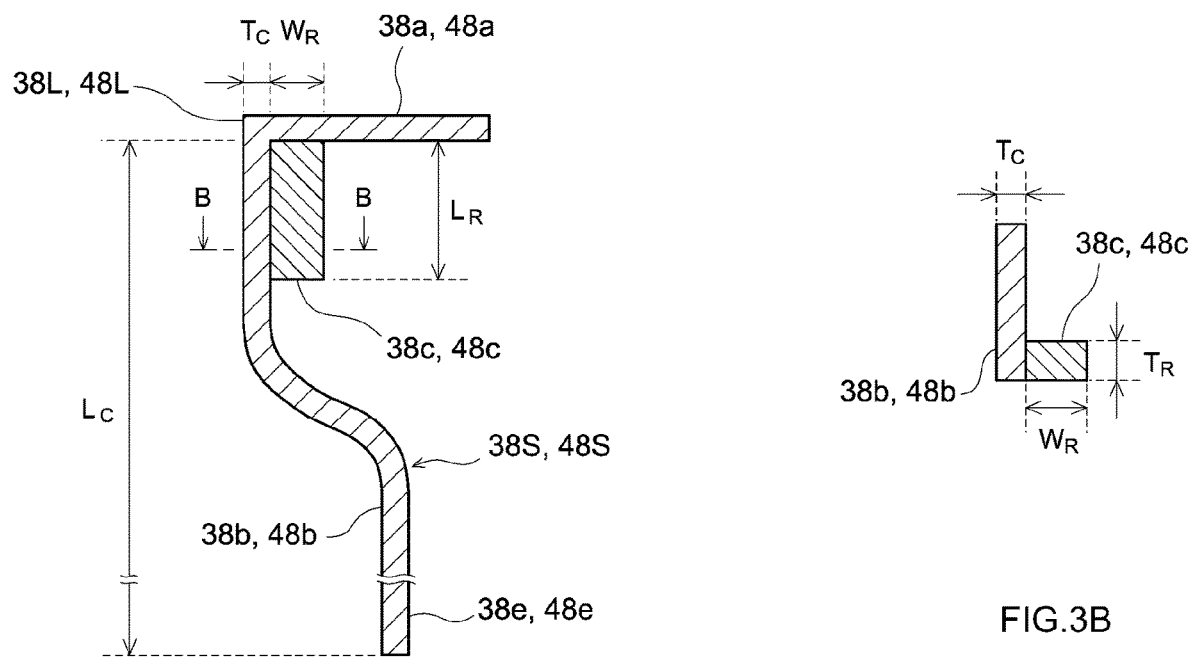
FIG. 3A is a side view of a collector member in accordance with one embodiment.
FIG. 3B is a cross sectional view along B-B in FIG. 3A.
Figure 4:
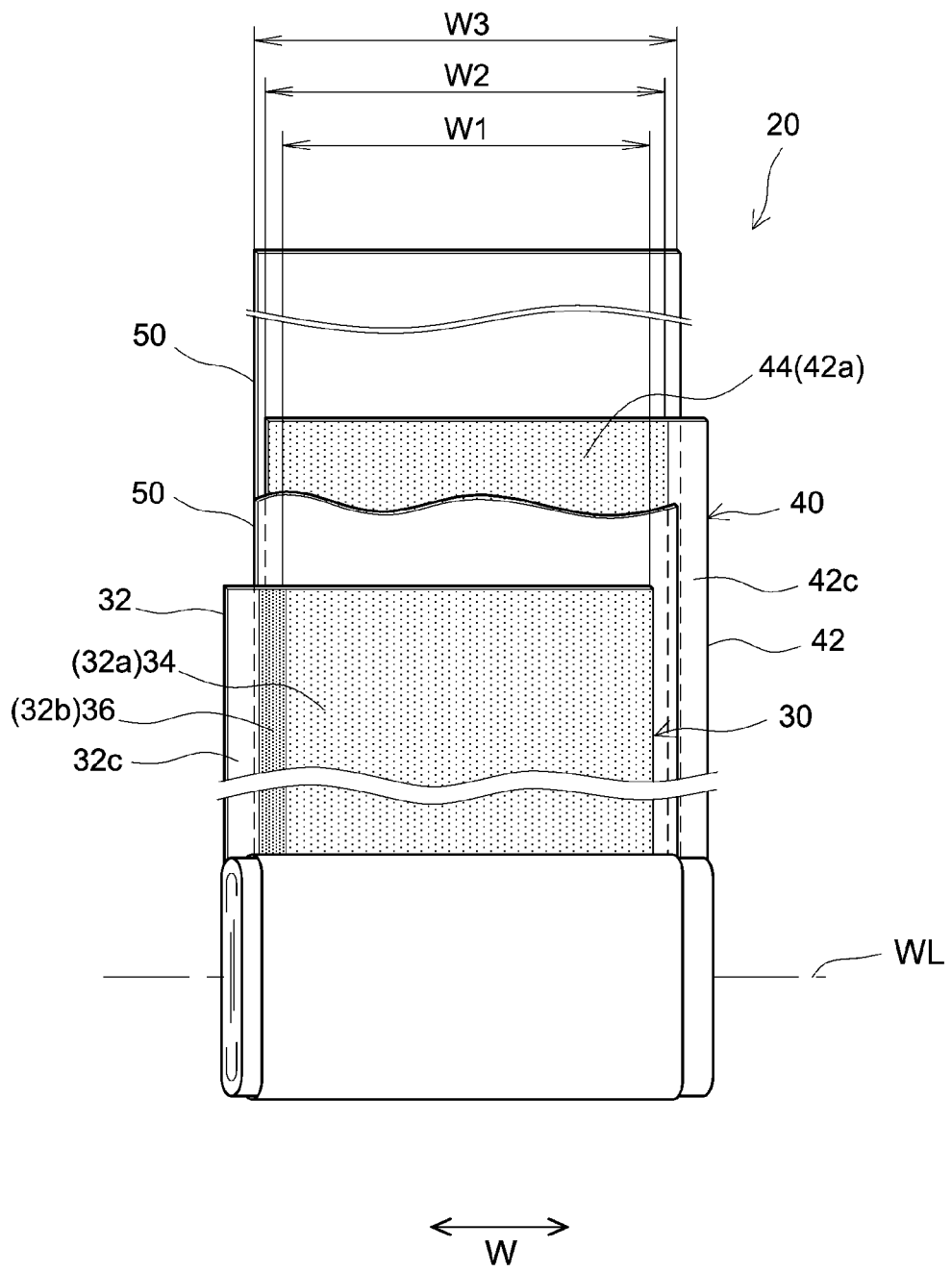
FIG. 4 is a partially developed view for illustrating a configuration of a wound type electrode body in accordance with one embodiment.
Figure 5:
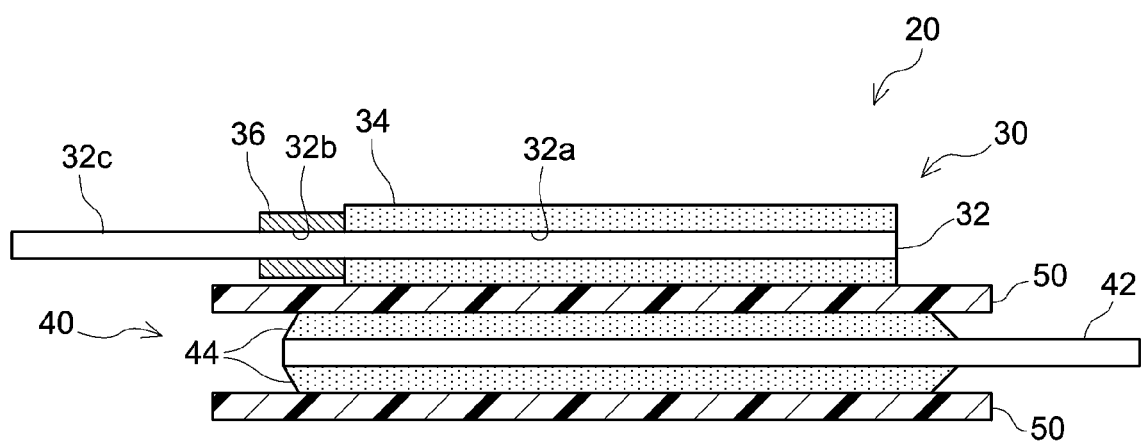
FIG. 5 is a cross sectional schematic view for illustrating a configuration of an electrode body in accordance with one embodiment.

FIG. 1 is a cutaway perspective view showing a configuration of a lithium ion battery (which will be simply referred to as a "secondary battery") 1 in accordance with one embodiment. FIG. 2 is an essential part side view thereof. FIG. 3A is a side view showing a configuration of a collector terminal, and FIG. 3B is a B-B cross sectional view thereof. FIG. 4 is a partially developed view for illustrating a configuration of a wound type electrode body 20, and FIG. 5 is a cross sectional view thereof. W in the drawing indicates the width direction of a battery case 10 and a wound type electrode body 20, and is in agreement with the direction of a winding axis WL of the wound type electrode body 20. H represents the height direction of the battery case 10. Further, the winding axis WL and the direction orthogonal to the height direction of the battery case 10 may be referred to as the thickness directions of the battery case 10 and the wound type electrode body 20. However, the directions do not restrict the setting aspects of the secondary battery at all.

The lithium ion secondary battery 1 is configured such that the wound type electrode body 20 including the positive electrode 30, the negative electrode 40, and the separator 50 is accommodated in the battery case 10 together with a nonaqueous electrolyte not shown. The wound type electrode body 20 has a shape in which the separator 50, the negative electrode 40, the separator 50, and the positive electrode 30 are sequentially stacked in this order, and are wound in an elliptical shape in cross section about the winding axis WL as the center. For the electrode body 20, respective collector regions 32c and 42c of collectors 32 and 42 described later protrude to both ends in the width direction. The electrode body 20 is connected to the collector members 38 and 48 at the collector regions 32c and 42c, respectively, and is fixed to the battery case 10.

The positive electrode 30 typically includes the positive electrode collector 32, and porous, and an insulation layer 36 is included therein so as to be adjacent to the positive electrode active material layer 34. The positive electrode collector 32 is a support member of the positive electrode active material layer 34, and can be a conductive member for extracting electric charges from the positive electrode active material layer 34. For the positive electrode collector 32, for example, metal foil such as aluminum (including aluminum alloy) foil is preferably used. The positive electrode collector 32 includes an active material layer forming region 32a, an insulation layer forming region 32b, and a collector region 32c. The active material layer forming region 32a occupies the most part of the positive electrode collector 32, the insulation layer forming region 32b is adjacent to the active material layer forming region 32a, and the collector region 32c is adjacent to the insulation layer forming region 32b. The positive electrode collector 32 of this example is long, and is divided in the width direction in the order of the active material layer forming region 32a, the insulation layer forming region 32b, and the collector region 32c. As one example, the dimension in the width direction of the insulation layer forming region 32b is about 2.7 to 6 mm, and the dimension in the width direction of the collector region 32c is about 8.5 to 12.5 mm. The positive electrode active material layer 34 is formed in a band shape on the surface of the active material layer forming region 32a. The insulation layer 36 is formed in a band shape on the surface of the insulation layer forming region 32b. In the collector region 32c, the collector is exposed.

The positive electrode active material layer 34 contains a particulate positive electrode active material. The positive electrode active material layer 34 is configured as follows: positive electrode active materials are bound to one another by a binder, and are bound to the active material layer forming region 32a. The pores of the positive electrode active material layer 34 are impregnated with a nonaqueous electrolyte. As the positive electrode active materials, for example, one or combinations of two or more of lithium transition metal composite oxides such as lithium nickel cobalt manganese composite oxides (e.g., $LiN_{1/3}Co_{1/3}Mn_{1/3}O_2$), lithium nickel composite oxides (e.g., $LiNiO_2$), lithium cobalt composite oxides (e.g., $LiCoO_2$), and lithium nickel manganese composite oxides (e.g., $LiNi_{0.5}Mn_{1.5}O_4$) capable of reversibly occluding/releasing lithium ions are used. The positive electrode active material layer 34 can contain, other than the positive electrode active material, a conductive material such as acetylene black (AB), a binder such as an acrylic polymer, polyvinylidene fluoride (PVDF), or styrene butadiene rubber (SBR) for binding these, and other additives.

The thickness of the positive electrode active material layer 34 after pressing (which is the average thickness; the same shall apply hereinafter.) can be set at typically 10 vim or more, for example, 15 vim or more, and typically 50 vim or less, 30 μm or less, for example, 25 vim or less. Further, the density of the positive electrode active material layer 34 has no particular restriction, and can be set at typically 1.5 $g/cm^3$ or more, for example, 2 $g/cm^3$ or more and 3 $g/cm^3$ or less, and for example, 2.5 $g/cm^3$ or less.

Incidentally, in the present specification, "average particle diameter" represents the cumulative 50% particle diameter ($D_{50}$) in the volume-based particle size distribution obtained by the laser diffraction scattering method unless otherwise specified.

The insulation layer 36 has electric insulation property, and is configured so as to be able to prevent a short circuit between the end of the negative electrode active material layer 44 and the positive electrode collector 32, for example, even when the separator 50 is broken, or the separator 50 is dissolved/shrunk, or the like. The insulation layer 36 is configured such that inorganic fillers are mutually bound by a binder, and bound with the insulation layer forming region 32b. The insulation layer 36 may be a porous layer enabling passage of electric charge carriers therethrough. The insulation layer 36 is provided in the region adjacent to the positive electrode active material layer 34, and opposed to at least the negative electrode active material layer 44. The insulation layer 36 may protrude outwardly of the negative electrode active material layer 44 in the width direction by a dimension α. The dimension α is designed at the dimension capable of allowing sufficient covering of the end of the negative electrode active material layer 44 by the insulation layer 36 so as to avoid the situation in which the negative electrode active material layer 44 and the positive electrode collector 32 are opposed to each other via only the separator 50 even when misalignment is caused for the negative electrode active material layer 44. The dimension a may desirably designed at a dimension enough to prevent the insulation layer 36 from protruding from the end of the separator 50 in order to avoid poor foil collection of the collector 32 (collector region 32c).

Examples of the inorganic fillers forming such an insulation layer 36 may include inorganic oxides such as alumina ($Al_2O_3$), magnesia (MgO), silica ($SiO_2$), and titania ($TiO_2$), clay minerals such as mica, talk, boehmite, zeolite, apatite, and kaolin, and glass materials. Out of these, boehmite ($Al_2O_3 \cdot H_2O$), alumina ($Al_2O_3$), and the like which have stable quality, and further are low-priced, and readily available are preferably used. Incidentally, the parenthesized molecular formula is a typical composition, and the present invention is not necessarily limited to this composition. Any one of these may be included alone, or two or more thereof may be included in combination. As the binders to be included in the insulation layer 36, for example, various binders usable for the positive electrode active material layer can be preferably used. The proportion of the binder included in the insulation layer 36 is, for example, typically 1 mass % or more, preferably 5 mass % or more, and may be 8 mass % or more, 10 mass % or more, or the like. The binder included in the insulation layer 36 is in an amount of, for example, typically 30 mass % or less, may be 25 mass % or less, or may be 20 mass % or less, 18 mass % or less, or 15 mass % or less. As one typical example thereof, the amount may be appropriately adjusted at 5 to 20 mass %. The thickness of the insulation layer 36 may be typically 20 μm or less, for example, 18 μm or less, 15 μm or less, or 10 μm or less (e.g., less than 10 μm), or may be set at 8 μm or less, for example, 6 μm or less, or 5 μm or less. The thickness of the insulation layer 36 may be typically 3 μm or more. Incidentally, such an insulation layer 36 may have a weight per unit area of about 0.5 mg/cm² or more, 0.7 mg/cm² or more, 1 mg/cm² or more, or the like, and 1.5 mg/cm² or less, 1.3 mg/cm² or less, 1.2 mg/cm² or less, or the like.

The negative electrode 40 can include typically a negative electrode collector 42, and porous negative electrode active material layers 44 formed on both surfaces thereof. Specifically, the negative electrode collector 42 includes an active material layer forming region 42a and a collector region 42c. The active material layer forming region 42a occupies the most part of the negative electrode collector 42, and the collector region 42c is adjacent to the active material layer forming region 42a. The negative electrode collector 42 of this example is long, and is divided in the width direction into the active material layer forming region 42a and the collector region 42c. As one example, the dimension in the width direction of the collector region 42c is about 8 to 12 mm. The negative electrode active material layer 44 is formed in a band shape on the surface of the active material layer forming region 42a. In the collector region 32c, the collector is exposed. The pores of the negative electrode active material layer 44 are impregnated with a nonaqueous electrolyte. For the negative electrode collector 42, for example, metal foil such as copper foil is preferably used.

The negative electrode active material layer 44 contains a particulate negative electrode active material. As the negative electrode active materials, for example, one, or combinations of two or more of carbon type materials such as graphite carbon and amorphous carbon, silicon, lithium transition metal oxide, and lithium transition metal nitride, capable of reversibly occluding/releasing lithium ions are used. The negative electrode active material layer 44 may include, other than the negative electrode active material, a binder such as polyvinylidene fluoride (PVDF), or styrene butadiene rubber (SBR), or a thickener such as carboxymethyl cellulose (CMC), for binding these. The thickness after pressing of the negative electrode active material layer 44 (which is the average thickness of one side; the same shall apply hereinafter.) may be, for example, 20 μm or more, typically 40 μm or more, for example, from the viewpoint of an increase in capacity, 50 μm or more. The average thickness of the negative electrode active material layer 44 may be, for example, 100 μm or less, typically, 80 μm or less, for example, 65 μm or less. Further, the density of the negative electrode active material layer 44 has no particular restriction, and can be set at, for example, 0.8 g/cm³ or more, typically, 1.0 g/cm³ or more, and 1.5 g/cm³ or less, typically, 1.4 g/cm³ or less, for example, 1.2 g/cm³ or less.

The separator 50 is a constituent element for insulating the positive electrode 30 and the negative electrode 40 from each other, and providing a migration path for electric charge carriers between the positive electrode active material layer 34 and the negative electrode active material layer 44. Such a separator 50 is arranged between the positive electrode active material layer 34 and the negative electrode active material layer 44. Such a separator 50 can be preferably formed of a microporous resin sheet including a resin such as polyethylene (PE), polypropylene (PP), polyester, cellulose, or polyamide. Out of these, a microporous sheet including a polyolefine resin such as PE or PP is preferable because the shutdown temperature can be preferably set within the range of 80° C. to 140° C. (typically, 110° C. to 140° C., for example, 120° C. to 135° C.). Such a separator 50 may have a monolayer structure including a single material, or may have a structure of lamination of two or more microporous resin sheets having different material qualities and properties (e.g., average thickness and porosity) (e.g., a three-layered structure in which PP layers are stacked on both surfaces of a PE layer). The thickness (which is the average thickness; the same shall apply hereinafter.) of the separator 50 has no particular restriction, and can be set at, generally 10 μm or more, typically, 15 μm or more, for example, 17 μm or more. Further, the upper limit can be set at 40 vim or less, typically, 30 μm or less, for example, 25 vim or less. The average thickness of the base material falls within the foregoing range. As a result, the permeability of the electric charge carrier can be kept good, and microscopic short circuit (leakage current) becomes less likely to be caused. For this reason, the input output density and the safety can be combined at a high level.

Incidentally, in the electrode body 20, the width W1 of the positive electrode active material layer 34, the width W2 of the negative electrode active material layer 44, and the width W3 of the separator 50 satisfy the relationship of W1<W2<W3. Further, the negative electrode active material layer 44 covers the positive electrode active material layer 34 at the opposite ends thereof in the width direction, and the separator 50 covers the negative electrode active material layer 44 at the opposite ends thereof in the width direction. Further, the insulation layer 36 covers the positive electrode collector 32 at least in the region opposed to the end of the negative electrode active material layer 44 while being adjacent to the positive electrode active material layer 34. However, the electrode body of the lithium ion secondary battery 1 herein disclosed is not limited to a wound type electrode body, and may be an electrode body of a so-called flat-plate lamination type, for example, in a form in which a plurality of positive electrodes 30 and negative electrodes 40 are respectively insulated by the separators 50, and are stacked.

The nonaqueous electrolyte includes a nonaqueous solvent and an electrolyte support salt. The nonaqueous solvent and the electrolyte support salt have no particular restriction on the kind, and may be the same as those used for the electrolyte of a conventional secondary battery. Preferable examples of the electrolyte support salt include lithium salts such as $LiPF_6$ and $LiBF_4$. Preferable examples of the nonaqueous solvent include aprotic solvents such as carbonates, esters, and ethers. Out of these, cyclic carbonates such as ethylene carbonate (EC) and propylene carbonate (PC), chain carbonates such as diethyl carbonate (DEC), dimethyl carbonate (DMC), and ethyl methyl carbonate (EMC), and fluorinated chain or fluorinated cyclic carbonates obtained by fluorinating the carbonates are preferably included each alone, or two or more thereof. The concentration of the lithium salt in the electrolyte can be set at, for example, 0.8 to 1.3 mol/L. The nonaqueous electrolyte can include additives such as a film forming agent and an overcharge inhibitor other than these.

The battery case 10 includes a case main body 11 having an opening at a first surface (herein, the top surface), and a lid member 12 for sealing the opening. The case main body 11 of this example is of a flat bottomed square tube type including a bottom surface 11c, a pair of wide side surfaces 11a continuous to the bottom surface 11c, and wide in the width direction, and one narrow side surface 11b continuous to the bottom surface 11c and the wide side surface 11a. The lid member 12 is formed so as to be able to hermetically seal the opening formed by the upper ends of the wide side surface 11a and the narrow side surface 11b. The lid member 12 is equipped with a positive electrode external terminal 38T and a negative electrode external terminal 48T, an injection hole, and a safety valve. Although the battery case 10 is not limited to this, the battery case 10 is preferably formed of, for example, a metal such as iron, copper, aluminum, or titanium, and an alloy including these (e.g., steel), or a high strength resin.

Figure 6A:
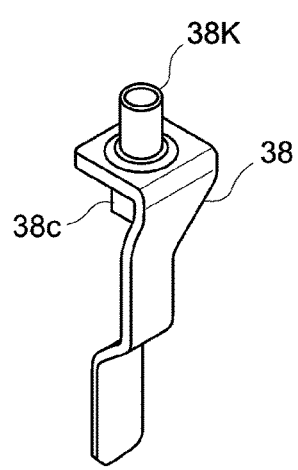
FIGS. 6A, 6B, and 6C are schematic views for illustrating a configuration of each collector member in accordance with other embodiments, respectively.
Figure 6B:
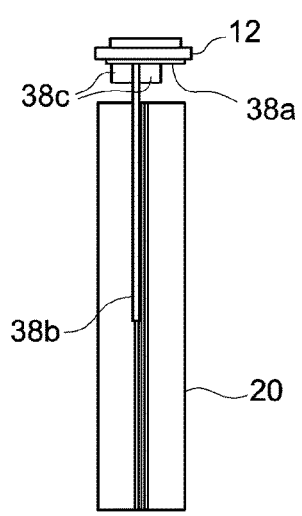
Figure 6C:
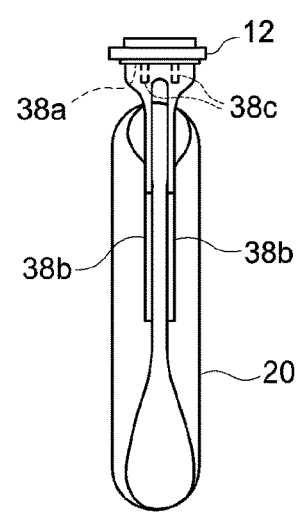

The positive electrode external terminal 38T and the negative electrode external terminal 48T are electrically connected with the positive electrode collector member 38 and the negative electrode collector member 48 provided on the case inside side, respectively, while being insulated from the lid member 12. The terminal structures on the positive electrode side and on the negative electrode side are mostly identical with each other. For this reason, below, by taking the positive electrode side as an example, the terminal structure and the collector members 38 and 48 will be described. The following description on the positive electrode collector member 38 similarly applies to the negative electrode collector member 48. Although the details are omitted, with the terminal structure of a typical secondary battery 1, as shown in FIG. 2, from the case outside (herein, the top), the positive electrode external terminal 38T, an external insulation member (not shown), the lid member 12, an internal insulation member (not shown), and the positive electrode collector member 38 are stacked in this order, and a hole not shown is provided coaxially. Then, a caulking member 38K (see FIG. 6A) made of a metal, inserted into this hole integrally and tightly caulks these. As a result, each member is fixed to the lid member 12. Herein, the positive electrode collector member 38 is electrically connected with the positive electrode external terminal 38T by the caulking member 38K. The external insulation member and the internal insulation member are mechanically connected with each other by the caulking member 38K. As a result, the positive electrode external terminal 38T, the positive electrode collector member 38, and the caulking member 38K are electrically insulated from the lid member 12 by the external insulation member and the internal insulation member. Incidentally, the caulking member 38K may also be previously integrally provided on the top surface of a first portion 38a of the collector member 38 as shown in FIGS. 6A, 6B, and 6C. The caulking member 38K is subjected to chalking, so that the protrusion amount from the top surface of the first portion 38a is reduced (see, FIG. 1, or the like).

The positive electrode collector member 38 includes the first portion 38a and a second portion 38b. The first portion 38a and the second portion 38b are generally in a sheet shape. The positive electrode collector member 38 is fixed to the lid member 12 of the battery case 10 by the first portion 38a as described above. The second portion 38b is continuous to the first portion 38a, and is bent with respect to the first portion 38a. The portion between the first portion 38a and the second portion 38b is a bent part 38L. The positive electrode collector member 38 of the present embodiment is bent to about 90° at the bent part 38L. The second portion 38b extends downwardly along the wide side surface 11a of the case main body 11. The second portion 38b is curved in a substantially S shape inwardly of the battery case 10 at a prescribed-length downward extension thereof. Then, at the end 38e under the curved part 38S, the second portion 38b extends downwardly along the wide side surface 11a again. The second portion 38b is bonded with the collector region 32c of the wound type electrode body 20 at the flat-sheet-shaped end 38e under the curved part 38S. With such a configuration, the positive electrode collector member 38 can be configured as follows: the curved part R of the wound type electrode body 20 can be arranged in the space formed between the first portion 38a and the curved part 38S, so that the wound type electrode body 20 can be supported and fixed without breaking the curved part R. Incidentally, the positive electrode collector member 38 and the collector region 32c of the electrode body 20 are preferably connected with each other by ultrasonic welding. Further, the negative electrode collector member 48 and the collector region 42c of the electrode body 20 are preferably connected with each other by resistance welding. As a result, in the secondary battery 1, an electric energy can be charged to the electrode body 20, and an electric energy can be extracted from the electrode body 20 to an external circuit through the positive electrode external terminal 38T and the negative electrode external terminal 48T.

The positive electrode collector member 38 further includes a rib 38c connected to the first portion 38a and the second portion 38b at the bent part 38L. The rib 38c is a small-piece-shaped portion. The rib 38c is, as shown in FIG. 3A, placed across the first portion 38a and the second portion 38b. The rib 38c is disposed so as to be orthogonal to at least one, preferably both of the first portion 38a and the second portion 38b. In the present embodiment, the rib 38c is connected to the surfaces of the first portion 38a and the second portion 38b each on the side thereof opposed to the electrode body 20. Such a configuration can preferably suppress the second portion 38b from relatively rocking with respect to the first portion 38a. In other words, the first portion 38a and the second portion 38b are suppressed from being deformed in a direction in which the mutually formed angle (θ) decreases (e.g., θ<90°) and a direction in which the angle increases (e.g., θ>90°).

Although such a rib 38c is not limited thereto, preferably, the first portion 38a, the second portion 38b, and the rib 38c are continuously and integrally formed. Namely, although the first portion 38a, the second portion 38b, and the rib 38c of the positive electrode collector member 38 may be formed of different members bonded together, these may be formed by processing one sheet-shaped metal member by at least one of bending and pressing. In other words, the positive electrode collector member 38 may be at least one of a bent product and a pressed product. As a result, a joint is not formed at the first portion 38a, the second portion 38b, and the rib 38c. This is preferable because when a vibration is applied to the secondary battery 1, a fault such as breakage of the joint due to stress concentration to the joint is accordingly less likely to be caused. Incidentally, any those skilled in the art can confirm whether the first portion 38a, the second portion 38b, and the rib 38c of the positive electrode collector member 38 are manufactured by bending and/or pressing or not by observing the metal structure.

Below, the results of a study on the shapes of the ribs 38c and 48c of the collector members 38 and 48 will be shown, and preferable shapes of the ribs 38c and 48c will be described.

As shown in FIG. 3A, for each length of the second portions 38b and 48b of the collector members 38 and 48, the distance from (each surface on the rib side of) the first portions 38a and 48a to each extreme end of the ends 38e and 48e of the second portions 38b and 48b is referred to as the length $L_C$ (distance $L_C$) of the second portions 38b and 48b. Namely, the length $L_C$ of the second portion 38b or 48b is the dimension not in view of the curve length of the curved part 38S. Whereas, for each thickness of the second portions 38b and 48b, each dimension of the second portion 38b and 48b in a direction orthogonal to the wide side surface 11a is referred to as the thickness $T_C$(mm). For each length of the ribs 38c and 48c, each dimension of the ribs 38c and 48c in a direction along the length $L_C$ is referred to as the length $L_R$ (mm) of the ribs 38c and 48c. For each thickness of the ribs 38c and 48c, the dimension in a direction in parallel with the wide side surface 11a is referred to as the thickness $T_R$(mm) of the ribs 38c and 48c. For each width of the ribs 38c and 48c, the dimension in a direction along the thickness $T_C$ of the second portions 38b and 48b is referred to as the width $W_R$(mm).

Rib Length

For the collector member with the length $L_R$ of the rib changed in five ways, and also for the collector member not provided with a rib, a vibration test was conducted under the following conditions, thereby measuring the displacement amount of the extreme end of the second portion. The results are shown in Table 1 below as relative values with the displacement amount of the extreme end of the second portion when the vibration test was conductive for the collector member without a rib as "100". Then, the case where the relative value of the displacement amount is 20 or less is assumed as a sufficient vibration suppressing effect (success: "AA" in Table 1), and the case where the relative value of the displacement amount is more than 20 is assumed as an insufficient vibration suppressing effect (failure: "CC" in Table 1).

Incidentally, the thickness $T_R$ of the rib of the collector member was assumed to be constant at "0.4/$T_C$" with respect to the thickness $T_C$ of the second portion, and the width $W_R$ of the rib was assumed to be constant at "0.47/$T_C$" with respect to the thickness $T_C$ of the second portion.

Vibration Test Conditions
    Acceleration: 10 G
    Frequency: 25 Hz
    Temperature: room temperature (25° C.)
    Vibration direction: width direction of rib (thickness direction of second portion)

TABLE 1

| Sample | 1 | 2 | 3 | 4 | 5 | 6 |
|---|---|---|---|---|---|---|
| Rib length $L_R$ | None | 0.04 Lc | 0.07 Lc | 0.10 Lc | 0.13 Lc | 0.16 Lc |
| Displacement amount [—] | 100 | 70 | 50 | 20 | 15 | 10 |
| Evaluation | CC | CC | CC | AA | AA | AA |

As shown in Table 1, it has been confirmed as follows: by setting the length $L_R$ of the rib at 0.1 time or more ($L_R \geq 0.1 \times L_C$) with respect to the length $L_C$ of the second portion, it is possible to effectively suppress the vibration. Although not specifically shown, the same tendency can also be observed for the case where the test is conducted for a collector member having different specifications such as shape and dimension. The length $L_R$ of the rib is preferably $L_R \geq 0.12 \times L_C$, more preferably $L_R \geq 0.15 \times L_C$, or $L_R \geq 0.2 \times L_C$, and may be set at, for example, $L_R \geq 0.3 \times L_C$, or $L_R \geq 0.5 \times L_C$. The upper limit of the length $L_R$ of the rib can be determined in view of the allowable dimension of the battery case within the range in which the curved part R of the electrode body 20 and the rib do not interfere with each other. For example, the upper limit of the length $L_R$ of the rib may be $1 \times L_C$, and examples thereof may include about $0.9 \times L_C$ and $0.8 \times L_C$.

Rib Thickness

For the collector members with the thickness $T_R$ of the rib changed in six ways, and also for the collector member not provided with a rib, a vibration test was conducted under the same conditions as those described above, thereby measuring the displacement amount of the extreme end of the second portion. The results are shown in Table 2 below as relative values with the displacement amount of the extreme end of the second portion when the vibration test was conductive for the collector member without a rib as "100". Then, the case where the relative value of the displacement amount is 20 or less is assumed as a sufficient vibration suppressing effect (success: "AA" in Table 2), and the case where the relative value of the displacement amount is more than 20 is assumed as an insufficient vibration suppressing effect (failure: "CC" in Table 2).

Incidentally, the length $L_R$ of the rib of the collector member was assumed to be constant at "$0.1 \times L_C$" with respect to the thickness $T_C$ of the second portion, and the width $W_R$ of the rib was assumed to be constant at "$0.47/T_C$" with respect to the thickness $T_C$ of the second portion.

TABLE 2

| Sample | 1 | 2 | 3 | 4 | 5 | 6 | 7 |
|---|---|---|---|---|---|---|---|
| Rib thickness $T_R$ | 0 | 0.1/Tc | 0.2/Tc | 0.4/Tc | 0.48/Tc | 0.56/Tc | 0.8/Tc |
| Displacement amount [—] | 100 | 50 | 40 | 20 | 20 | 15 | 15 |
| Evaluation | CC | CC | CC | AA | AA | AA | AA |

As shown in Table 2, it has been confirmed as follows: by setting the thickness $T_R$ of the rib at 0.4 time or more ($T_R \geq 0.4 \times 1/T_C$) with respect to the inverse ($1/T_C$) of the thickness $T_C$ of the second portion as shown in, for example, Table 2, it is possible to effectively suppress the vibration. Although not specifically shown, roughly the same tendency can also be observed for the case where the test is conducted for a collector member having different specifications such as shape and dimension. This thickness $T_R$ of the rib is preferably $T_R \geq 0.45/T_C$, more preferably $T_R \geq 0.48/T_C$, and may be, for example, $T_R \geq 0.5/T_C$, $T_R \geq 0.55/T_C$, $T_R \geq 0.6/T_C$, $T_R \geq 0.7/T_C$, or $T_R \geq 0.8/T_C$. The upper limit of the thickness $T_R$ of the rib can be determined in view of the processability of the collector member, the connectivity with the electrode body, and the like. As one example, when the rib is too thick, it becomes difficult to form the rib by extrusion. Further, when the rib is too thick, the connection between the electrode body and the collector member may become difficult. From such viewpoints, the upper limit of the thickness $T_R$ of the rib may be set, for example, with about ⅓ the width of the collector member (the dimension in the direction orthogonal to the length $L_C$ and the thickness $T_C$) as a guide. The thickness $T_R$ of the rib may be 2/7 or less, ¼ or less, ⅕ or less the width of the collector member, or the like.

Rib Width

For the collector members with the width $W_R$ of the rib changed in six ways, and also for the collector member not provided with a rib, a vibration test was conducted under the same conditions as those described above, thereby measuring the displacement amount of the extreme end of the second portion. The results are shown in Table 3 below as relative values with the displacement amount of the extreme end of the second portion when a vibration test was conductive for the collector member without a rib as "100". Then, the case where the relative value of the displacement amount is 20 or less is assumed as a sufficient vibration suppressing effect (success: "AA" in Table 3), and the case where the relative value of the displacement amount is more than 20 is assumed as an insufficient vibration suppressing effect (failure: "CC" in Table 3).

Incidentally, the length $L_R$ of the rib of the collector member was assumed to be constant at "$0.1 \times L_C$" with respect to the length $L_C$ of the second portion, and the thickness $T_R$ of the rib was assumed to be constant at "$0.4/T_C$" with respect to the thickness $T_C$ of the second portion.

TABLE 3

| Sample | 1 | 2 | 3 | 4 | 5 | 6 | 7 |
|---|---|---|---|---|---|---|---|
| Rib thickness $W_R$ | 0 | 0.17/Tc | 0.25/Tc | 0.33/Tc | 0.47/Tc | 0.58/Tc | 0.83/Tc |
| Displacement amount [—] | 100 | 60 | 20 | 20 | 15 | 15 | 10 |
| Evaluation | CC | CC | AA | AA | AA | AA | AA |

As shown in Table 3, it has been confirmed as follows: by setting the width $W_R$ of the rib at 0.25 time or more ($W_R \geq 0.25 \times 1/T_C$) with respect to the inverse ($1/T_C$) of the thickness $T_C$ of the second portion, it is possible to effectively suppress the vibration. Although not specifically shown, the same tendency can also be observed for the case where the test is conducted for a collector member having different specifications such as shape and dimension. The width $W_R$ of the rib is preferably $W_R \geq 0.3/T_C$, more preferably $W_R \geq 0.4/T_C$, or $W_R \geq 0.5/T_C$, and may be, for example, $W_R \geq 0.6/T_C$, $W_R \geq 0.8/T_C$, or $W_R \geq 1/T_C$. The upper limit of the width $W_R$ of the rib can be determined in view of the processability of the collector member, the accommodability in the case, and the like. As one example, when the width $W_R$ of the rib is too large, it becomes difficult to form the rib by extrusion. Further, a too large width $W_R$ of the rib may cause interference between the case covering the electrode body, an insulation film (not shown), or the like and the rib upon accommodating the electrode body in the case or in the case, and hence is not preferable. From such a viewpoint, the upper limit of the width $W_R$ of the rib can be set at a dimension capable of avoiding such interference. The width $W_R$ of the rib may desirably be set to be, for example, about ½, or may desirably be set about ⅓ or less the thickness of the electrode body (the dimension in each direction orthogonal to the winding axis WL and the height direction H). Further, the width $W_R$ of the rib may desirably be set to be, for example, about ½, or also may be desirably set at about ⅓ or less the dimension of the second portion in the thickness direction (each direction orthogonal to the winding axis WL and the height direction H).

In the embodiment, the rib 38c was, as shown in FIG. 3A, a rectangular sheet-shaped body as seen from the direction along the wide side surface 11a. However, the shape of the rib 38c is not limited to this. For example, the rib 38c may lack the end of the portion connected to the first portion 38a and the second portion 38b in the region opposite to the bent part 38L across the line connecting two ends opposite to the bent part 38L. For example, the rib 38c may be a triangle formed by connecting the bent part 38L and the two ends on the opposite side, respectively. Further, for example, for the rib 38c, the corner part not connected to the first portion 38a and the second portion 38b may be subjected to chamfering. The chamfering may be chamfering of one corner part of the rectangle into an R surface or a C surface, or may be chamfering into an R surface so as to gently connecting the two ends on the opposite side (i.e., to form the rectangle into a fan shape). Further, in the example shown in FIG. 3B, the rib 38c is provided so as to be connected to the end of the second portion 38b on the side thereof farther from the center in the width direction of the battery case. However, the position of the rib 38c is not limited to this. The rib 38c may be provided at the end of the second portion 38b closer to the center in the width direction of the battery case, or may be provided so as to be connected to the center in the width direction of the second portion 38b, or to other positions.

In the embodiment, only respective ones of ribs 38c and 48c are provided at the collector members 38 and 48, respectively. However, respective two or more of the ribs 38c and 48c may be provided at respective ones of the collector members 38 and 48, respectively. For example, in the example shown in FIG. 3B, one rib 38c is provided at one positive electrode collector member 38. However, the number of the ribs 38c is not limited to this. Two or more, for example, a plurality of such as two, three, or four ribs 38c may be provided at one positive electrode collector member 38. In this case, all the ribs 38c may have the same shape, or one or some ribs 38c may independently have different shapes. When there are a plurality of ribs 38c, respective ribs 38c may be desirably arranged dispersed in the width direction (W) of the second portion 38b so as to preferably suppress the fluctuations in angle formed between the first portion 38a and the second portion 38b. For example, the ribs 38c may be arranged at regular intervals in the width direction of the second portion 38b. Incidentally, when the first portion 38a and the second portion 38b are connected to each other not in an L shape in cross section but in a T shape in cross section at the bent part 38L thereof, the ribs 38c may be provided at only one surface of the second portion 38b, or may be provided at both surfaces thereof (see FIG. 6B). In this case, for each thickness $T_R$ and each width $W_R$ of the ribs 38c and 48c, each total thickness $T_R$ and each total width $W_R$ of respective two or more ribs 38c and 48c preferably fall within the respective ranges.

In the embodiment, the second portions 38b and 48b of the collector members 38 and 48 were each in the shape of a rectangle (in the shape of a band) longer in the height direction as seen from the side of the wide side surface. However, each shape of the second portions 38b and 48b as seen from the side of the wide side surface may also be in other shapes than a rectangle. For example, at each portion closer to the bent parts 38L and 48L, each width of the second portions 38b and 48b may be larger, and the first portions 38a and 48a and the second portions 38b and 48b may be connected to each other, respectively, at a longer dimension. Then, each width of the second portions 38b and 48b may continuously or stepwise narrow with approach toward bottom (see FIG. 6A).

Further, the second portions 38b and 48b were provided along the wide side surface of the battery case 10. However, the second portions 38b and 48b may be provided along the narrow side surface of the battery case 10. In this case, the second portions 38b and 48b may be further bent, thereby to be bonded to the collector regions 32c and 42c of the electrode body 20, respectively. For example, for the second portions 38b and 48b, as shown in FIG. 6C, at least the lower portions thereof to be bonded to the collector regions 32c and 42c of the electrode body 20 each may be bifurcated by a slit. When each lower end of the second portions 38b and 48b is bifurcated, the collector part of the wound type electrode body 20 can be divided into two parts with reference to the winding axis WL, and bound, respectively. These can be connected to respective bifurcated portions of the second portion 38b in a divided manner, respectively. With such a configuration, in bonding between the wound type electrode body 20 and the collector members 38 and 48, the deformation amount and the load applied to the collector regions 32c and 42c can be reduced. Further, this is also preferable in that the impregnation of the electrolyte into the wound type electrode body 20 can be promoted. Incidentally, in this case, the ribs 38c and 48c may be desirably provided one each above respective centers in respective width directions of respective bifurcated portions of the second portions 38b and 48b (the width direction of the narrow side surface, the thickness direction of the battery case). Provision of respective ones of the ribs 38c and 48c at respective second portions 38b and 48b is also preferable in terms of enhancing the strengths of the second portions 38b and 48b.

In the embodiment, the electrode body was a wound type electrode body. However, the electrode body may be a sheet type electrode body. When the electrode body is a sheet type electrode body, as shown in FIG. 6B, the second portions 38b and 48b of the collector members 38 and 48 are each not required to have the curved part 38S. Also in that case, the dimensions of the ribs 38c and 48c preferably fall within the foregoing range.

In the embodiment, for the collector members 38 and 48, the second portions 38b and 48b were set so as to extend downwardly along the wide side surface. However, the aspect of attaching the collector members 38 and 48 to the battery case 10 is not limited to this. For example, the second portions 38b and 48b of the collector members 38 and 48 may be set so as to downwardly extend along the narrow side surface. In this case, as shown in FIG. 6C, the second portions 38b and 48b may be bonded at their respective two parts to the collector regions 32c and 42c of the electrode body, respectively. For example, as seen from the narrow side surface side, the second portions 38b and 48b are each bifurcated into two parts extending downwardly, and the wound type electrode body 20 is divided into two parts on the 3 o'clock side and the 9 o'clock side along the winding axis WL. Then, respective ones of the bifurcated parts of the second portions 38b and 48b may be bonded to the electrode body 20 on the 3 o'clock side, and respective others of the bifurcated parts may be bonded to the electrode body 20 on the 9 o'clock side. At this step, the ribs 38c and 48c may be provided, one for each of respective bifurcated parts of the second portions 38b and 48b. Further, the bifurcated parts of the second portions 38b and 48b may be respectively twisted so as to be in parallel with the collector regions 32c and 42c, and to be bonded to the collector regions 32c and 42c, respectively.

Up to this point, the present invention was described in details. However, these are merely illustrative, and do not limit the appended claims. The technology described in the appended claims include various modifications and changes of the foregoing specific examples.

What is claimed is:

1. A secondary battery, comprising:
    a battery case;
    an electrode body in which a positive electrode, a negative electrode, and a separator are stacked, with the positive electrode and the negative electrode being insulated from each other by the separator; and
    a collector member connected to the battery case and the electrode body, wherein
    the positive electrode includes
    a positive electrode collector including an active material layer forming region, an insulation layer forming region adjacent to the active material layer forming region, and a collector region adjacent to the insulation layer forming region,
    a positive electrode active material layer including a positive electrode active material provided on a surface of the active material layer forming region, and
    an insulation layer provided on a surface of the insulation layer forming region, the collector member includes a first portion, and a second portion continuous to the first portion and bent relative to the first portion, the first portion is fixed to the battery case, the second portion is connected, at an end thereof on an opposite side to the bent portion, to the collector region, the collector member further including a rib integrally formed, at the bent part, with the first portion and the second portion;

wherein the rib has a length that is shorter than a space between a top of the electrode body and the first portion of the collector member, and a width that is half or less than a thickness of the electrode body;

wherein the rib is connected, among surfaces of the first portion and the second portion, to a surface on an opposite side to the electrode body; and wherein the collector member includes the first portion, the second portion, and the rib, which are continuously and integrally formed, and is at least one of a bent product and a pressed product of a sheet-shaped metal.

2. The secondary battery according to claim 1, wherein the battery case is a square battery case including a case main body having an opening, and a lid member for covering the opening, the first portion is connected to an inner surface of the lid member, the second portion is bent along any one surface of the case main body surrounding the opening, and a length ($L_c$) of the collector member from the first portion to an extreme end of the end of the collector member and a length ($L_R$) of a dimension of the rib in a direction along the length ($L_c$) satisfy following relationship: $L_R \geq 0.1 \times L_c$.

3. The secondary battery according to claim 1, wherein the battery case is a square battery case including a case main body having an opening, and a lid member for covering the opening, the first portion is connected to an inner surface of the lid member, the second portion is bent along any one surface of the case main body surrounding the opening, a thickness ($T_c$) of a dimension of the collector member in a direction orthogonal to the one surface of the second portion and a thickness ($T_R$) of a dimension in a direction in parallel with the one surface of the rib satisfy following relationship: $T_R \geq 0.4 \times 1/T_c$.

4. The secondary battery according to claim 1, wherein the battery case is a square battery case including a case main body having an opening, and a lid member for covering the opening, the first portion is connected to an inner surface of the lid member, the second portion is bent along any one surface of the case main body surrounding the opening, a thickness ($T_c$) of a dimension in a direction orthogonal to the one surface of the second portion and a width ($W_R$) of a dimension of the collector member in a direction along the thickness ($T_c$) of the rib satisfy following relationship: $W_R \geq 0.25 \times 1/T_c$.

5. The secondary battery according to claim 1, wherein the electrode body is a wound type electrode body in which the positive electrode, the negative electrode, and the separator which are lengthy are stacked and wound.

* * * * *